United States Patent [19]

Blaimschein

[11] Patent Number: 5,402,962
[45] Date of Patent: Apr. 4, 1995

[54] METHOD AND APPARATUS FOR LAYING STRIPS OF TAPE MATERIAL

[75] Inventor: Gottfried Blaimschein, Steyr, Austria

[73] Assignee: GFM Gesellschaft für Fertigungstechnik und Maschinenbau Aktiengesellschaft, Steyr, Austria

[21] Appl. No.: 135,151

[22] Filed: Oct. 12, 1993

[30] Foreign Application Priority Data

Oct. 14, 1992 [AT] Austria .................... 2021/92

[51] Int. Cl.6 .............................. B32B 31/10
[52] U.S. Cl. ...................... 242/559; 242/562; 156/517; 156/523
[58] Field of Search ............. 242/56 R, 559, 562; 156/517, 519, 523, 574, 267; 83/649, 701, 858

[56] References Cited

U.S. PATENT DOCUMENTS

| | | | |
|---|---|---|---|
| 4,088,049 | 5/1978 | Benedict | 83/649 X |
| 4,208,238 | 6/1980 | August et al. | 156/523 X |
| 4,591,402 | 5/1986 | Evans et al. | 156/517 X |
| 4,636,276 | 1/1987 | Nozaka | 156/523 X |
| 4,708,761 | 11/1987 | Taniguchi et al. | 156/517 X |
| 5,064,130 | 11/1991 | Blaimschein et al. | 242/56 R |
| 5,066,352 | 11/1991 | Albers et al. | 242/56 R X |
| 5,264,067 | 11/1993 | Kuchta et al. | 156/517 X |

FOREIGN PATENT DOCUMENTS 0079735  5/1983  European Pat. Off. .

Primary Examiner—Daniel P. Stodola
Assistant Examiner—John P. Darling
Attorney, Agent, or Firm—Collard & Roe

[57] ABSTRACT

For rationally preparing and laying tape material strips, an exchangeable cassette is provided which is selectively insertable in a cutting station and a laying head. The cassette comprises two rotatable roll holders for a delivery roll from which tape material carried on a support layer is unreeled in the cutting station until the delivery roll is empty and a storage roll on which the support layer carrying cut tape material pieces is wound. The rotatable roll holders in the cutting station and the laying head and holders for the delivery and storage rolls are arranged to form a plug connection. The cassette also comprises guides defining therebetween processing zones freely accessible from outside the cassette for working on the tape material, and the processing zones are arranged in the range of a cutting device and the waste material removing devices in the cutting station, and in the range of a pressure device for pressing the tape material strips against the laying-up surface when the cassette is inserted on the laying head.

5 Claims, 3 Drawing Sheets

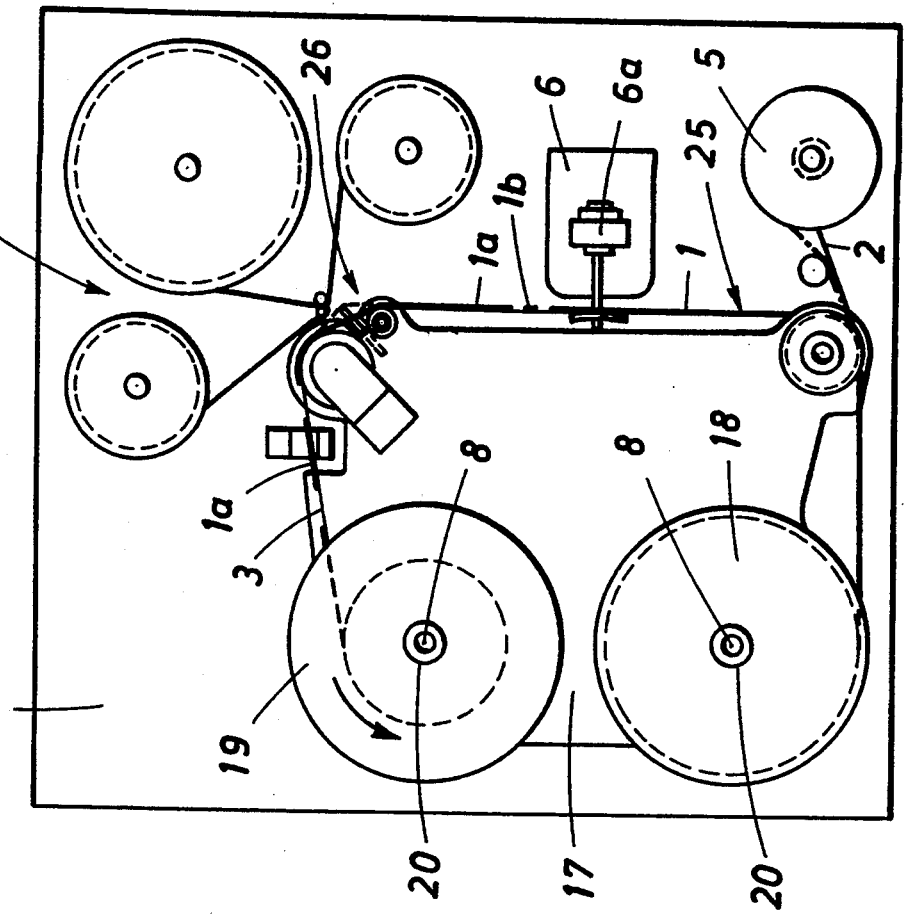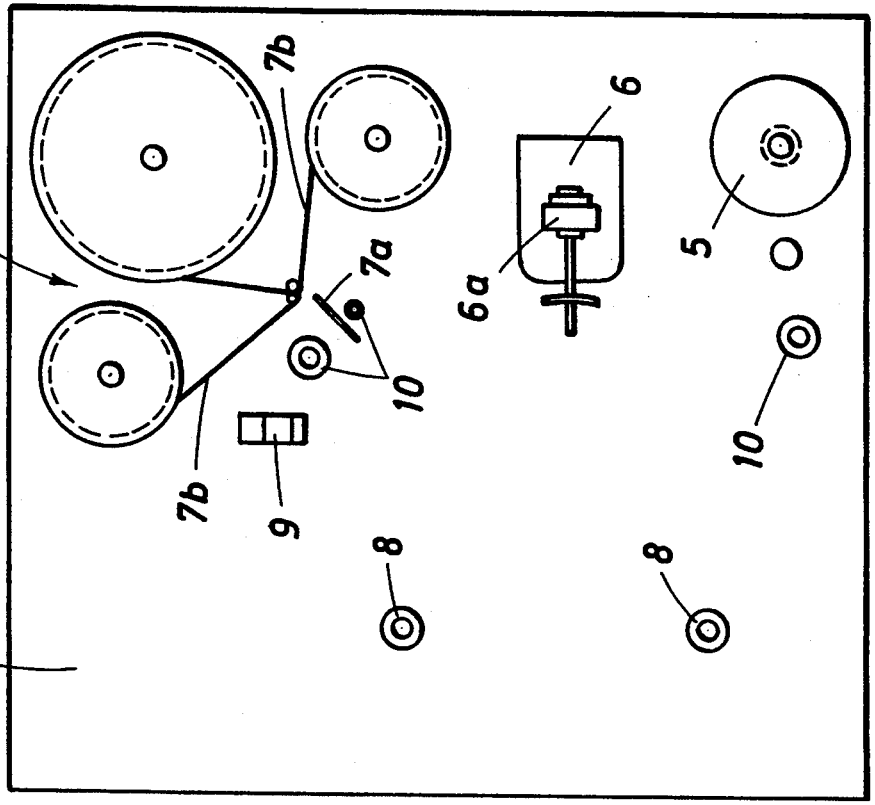

METHOD AND APPARATUS FOR LAYING STRIPS OF TAPE MATERIAL

BACKGROUND OF THE INVENTION

1. Field of the Invention

The present invention relates to a method of laying strips of a tape material carried on a support layer on a laying-up surface, which comprises the steps of preparing the tape material in a cutting station by unreeling the tape material carried on the support layer from a delivery roll until the delivery roll is empty, cutting the tape material into predetermined strips without cutting through the support layer, removing waste material remaining between the strips and winding the support layer and the strips carried thereon on a storage roll, and subsequently laying the prepared tape material with a laying head movable at a predetermined velocity relative to the laying-up surface by unreeling the support layer and the tape material strips carried thereon from the storage roll at a velocity dependent on the moving velocity of the laying head, pressing the tape material strips against the laying-up surface while lifting the strips from the support layer, and winding the support layer on the empty delivery roll. It also relates to an apparatus for carrying out this method.

Composite materials of fiber-reinforced synthetic resin, particularly pre-impregnated fiber-reinforced tapes, are used ever more widely, especially in the aircraft and automobile industries as well as in light constructions, because of their excellent strength, their low weight and their easy processing properties. These composite materials are usually pre-fabricated in sheet or band form and are then put together in strips to provide a special surface layer or the like. The strips to be laid, which consist substantially of synthetic resin-impregnated fibers, are tacky and, for easy handling, are usually embedded between a support layer carrying them and a cover layer. If there is a cover sheet, it must be removed from the continuous sheet or band material before the material is cut into the strips to be laid and the strips must then be pressed against a laying-up surface while they are lifted off the support layer.

2. Description of the Prior Art

Two different laying methods have been used for this purpose, one providing a unitary laying machine for preparing and laying the strips in a common stage, and the other one using a separate cutting station for preparing the strips in a first stage and a laying head for laying the prepared strips in a second stage. In the one method, the removal of the cover sheet, the cutting of the material into strips, the removal of the waste material, the pressing of the strips and the winding of the support layer must be effected in an assembly line, which produces a very heavy and expensive machine. Such a machine requires a high energy consumption and complex controls, leading to a relatively low laying efficiency and considerable operating failures. If the strip preparation and laying are effected in separate stages, laying proceeds considerably faster and more efficiently but it is necessary to place the material manually in the cutting station for preparation and on the laying head for laying and to thread the material on the respective rolls manually. This is inefficient and time-consuming, and it often leads to difficulties in synchronizing the preparation and laying stages.

SUMMARY OF THE INVENTION

It is the primary object of this invention to overcome these disadvantages in the known methods of laying strips of tape material and to improve the first-described method and apparatus so as to assure a rational and largely automated preparation and laying of the strips.

In the method of the invention, the above and other objects are accomplished by placing the delivery roll with the tape material carried on the support layer and the storage roll on an exchangeable cassette selectively insertable in the cutting station and on the laying head, inserting the cassette in the cutting station and cutting the tape material during the unreeling from the delivery roll and the winding on the storage roll, then inserting this cassette in the laying head and laying the tape material strips on the laying-up surface during the unreeling from the storage roll and the winding on the empty delivery roll from which the tape material carried by the support layer has previously been unreeled.

The invention is designed to improve an apparatus which comprises a cutting station for preparing the tape material, the cutting station comprising a delivery roll from which the tape material carried on the support layer may be unreeled until the delivery roll is empty, a device for cutting the tape material into predetermined strips without cutting through the support layer, means for removing waste material remaining between the strips and a storage roll on which the support layer and the strips carried thereon may be wound, and a laying head for laying the prepared tape material, the laying head being movable at a predetermined velocity relative to the laying-up surface while the support layer and the tape material strips carried thereon are unreeled from the storage roll at a velocity dependent on the moving velocity of the laying head, and the laying head comprising means pressing the tape material strips against the laying-up surface while lifting the strips from the support layer, and an empty roll for winding the support layer, the cutting station and the laying head further comprising rotatable roll holders for replaceably receiving respective ones of the rolls and means for guiding the tape material carried on the support layer between the rolls. The invention provides an exchangeable cassette selectively insertable in the cutting station and the laying head, the cassette comprising two holders for the delivery roll and the storage roll, the rotatable roll holders in the cutting station and the laying head and the holders for the delivery and storage rolls being arranged to form a plug connection, and the guiding means defining therebetween processing zones freely accessible from outside the cassette for working on the tape material, the processing zones being arranged in the range of the cutting device and of the waste material removing means when the cassette is inserted in the cutting station, and in the range of the means pressing the tape material strips against the laying-up surface when the cassette is inserted on the laying head.

With this arrangement and despite the two-stage operation, the composite material needs to be placed only once in an exchangeable cassette by guiding it during unreeling from the delivery roll to the storage roll to which it is attached for winding. If the composite material includes a cover layer, this may be guided simultaneously onto a stripping roller. No further manipulation is required during the subsequent preparation and laying stages. The composite material remains in the cassette and is not only freed of the cover layer as it is unreeled from the delivery roll and wound on the storage roll but the tape material is cut into the desired strips, the waste material resulting from the cutting operation is removed, and the thus prepared composite material comprised of the continuous support layer carrying the tape material strips is wound on the storage roll. At this point, the cassette is removed from the cutting station and placed on the laying head where the tape material strips are pressed from the support layer onto the laying-up surface as the support layer is lifted off the strips and wound back from the storage roll to the empty delivery roll. Since the material remains clamped between the rolls during unreeling and winding, it is possible to mark the material accurately and to control its winding velocity so that the cutting and laying operations may be properly synchronized in accordance with the respective strip characteristics.

In known apparatus for preparing and laying tape material strips, the laying head is separated from the cutting station, rotatable roll holders and guide and control means being provided. During the preparation in the cutting station, the composite material is unwound from the delivery roll and wound on the storage roll. Similarly, the prepared tape material strips are pressed onto the laying-up surface with the laying head as the material is unreeled from the storage roll and wound on the empty delivery roll. With the provision of an exchangeable cassette according to the invention, the cassette may be simply unplugged from the cutting station after preparation of the tape material strips and plugged into the laying head without the need for any manipulation of the material. The delivery and storage rollers are automatically engaged with the rotatable holders in the cutting station and laying head so that they are driven thereby while the material is readily accessible in the processing zones. With the use of two or more exchangeable cassettes, a variety of tape materials may be prepared and laid according to specific requirements without any loss of time.

Laying of the tape material strips will be further rationalized if the apparatus comprises a transfer station between the cutting station and the laying head, and a reciprocable cassette manipulator for moving the cassette between the stations and between the transfer station and the laying head. With this arrangement, the cassette with the composite material needs to be placed only once in the cutting station or a cassette in the cutting station needs to be provided manually only once with the composite material whereupon all subsequent preparation and laying operations proceed automatically, the transfer station facilitating the exchange between empty and new cassettes. The manipulator can move the prepared cassettes into the transfer station and the empty cassettes from the transfer station into the cutting station while the laying head may be moved to the transfer station to receive the prepared cassettes and to deliver the empty cassettes back to the transfer station. On the other hand, if the transfer station is not within the range of movement of the laying head and serves as a mere waiting station, the manipulator may be used to transfer the cassettes between the transfer station and the laying head.

It is particularly useful if the laying head further comprises a cutting means, such as an ultrasound cutting knife, vertically adjustably mounted on a side of the laying head facing away from the rotatable roll holders. This enables the workpiece resulting from the laying of the tape material strips to be cut to size immediately after the tape material strips have been laid. This requires only to lower the cutting means into a cutting position, and the laying head with its drive and control means can then be used as a pallet for operation of the cutting means. Pre-impregnated fiber-reinforced tapes are best cut with an ultrasound knife. The vertically adjustable mounting of the cutting knife on the reverse side of the laying head leaves the laying head in proper condition for the laying operation for which it is designed. Therefore, this arrangement does in no way interfere with the functioning of the exchangeable cassettes.

BRIEF DESCRIPTION OF THE DRAWING

The above and other objects, advantages and features of the present invention will become more apparent from the following detailed description of a now preferred embodiment thereof, taken in conjunction with the accompanying schematic drawing wherein

FIGS. 2 and 3 show a portion of the cutting station, respectively without and with the cassette;

DETAILED DESCRIPTION OF THE PREFERRED EMBODIMENT

Figure 1:
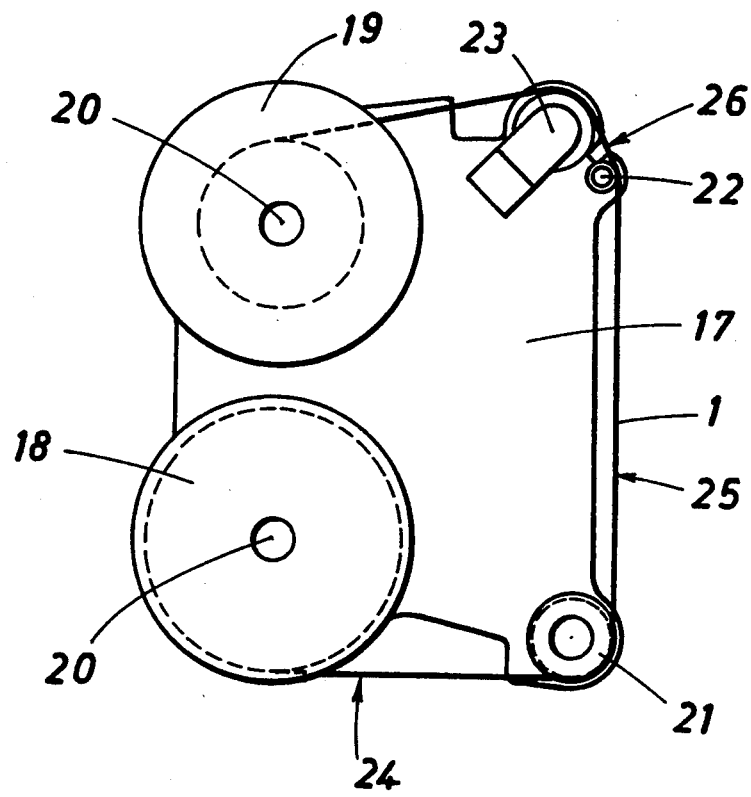
FIG. 1 is a top view of an exchangeable cassette according to this invention.

The illustrated apparatus is designed for laying strips of tape material 1 carried on support layer 3 and covered by cover layer 2 on laying-up surface 29, which may be a workpiece on work table 28. Tape material 1 may be a pre-impregnated fiber-reinforced tape. The apparatus comprises cutting station 4 for preparing tape material 1. The cutting station (FIGS. 2 and 3) comprises means 5, i.e. a stripping roller, for removing cover layer 2 before the tape material is cut into strips in the cutting station, device 6 for cutting the tape material into predetermined strips without cutting through the support layer, and means 7 for removing waste material 1b remaining between strips 1a. The cutting station further comprises two rotatable holders 8 for a delivery roll 18 and a storage roll 19. The rolls may be plugged onto the rotatable roll holders in the cutting station. Schematically indicated devices 9 and 10 control and guide the reeling of the material between the rolls.

The apparatus further comprises laying head 11 (FIGS. 4 and 5) movable at a predetermined velocity relative to laying-up surface 29 while support layer 3 and tape material strips 1a carried thereon are unreeled from storage roll 19 at a velocity dependent on the moving velocity of the laying head. The laying head also comprises rotatable holders 12 for the delivery and storage rolls. Rotatable roll holders 8 and 12 are structured to form a plug connection with the delivery and storage rolls.

To rationalize the laying of tape material strips 1a, tape material 1 carried on support layer 3 and covered by cover layer 2 is mounted in exchangeable cassette 17 selectively insertable in cutting station 4 and laying head 11. The cassette comprises holders 20 for delivery roll 18 and storage roll 19 wherebetween the material is unreeled and wound. Guiding and control devices 21, 22, 23, including guide rollers, define therebetween processing zones 24, 25, 26 freely accessible from outside cassette 17 for working on the tape material. The processing zones are arranged in the range of cutting device 6 and waste material removing means 7 when the cassette is inserted in cutting station 4, and in the range of means 16 pressing tape material strips 1a against laying-up surface 29 when the cassette is inserted on laying head 11.

When cassette 17 is inserted in cutting station 4, roll holders 20 fit on rotatable roll holders 8 to form a plug connection so that proper operation during the preparation stage is assured. In this position, processing zone 25 of cassette 17 is in the operating range of cutting device 6 and the tape material carried on support layer 3 is delivered to ultrasound knife 6a at the cutting device as it is unreeled from delivery roll 18 and wound on storage roll 19. The ultrasound knife cuts tape material 1 into strips 1a without cutting support layer 3 which carries the strips to storage roll 19 on which it is wound. The tape material carried on the support layer is unreeled until delivery roll 18 is empty. Processing zone 26 is located in the range of waste removal means 7. It is useful to mount a deflection roller 7a so that the material is bent sharply and removal films 7b, which receive the waste pieces lifted off the support layer due to the sharply bent path, pull the waste pieces off.

When cassette 17 is inserted in cutting station 4, cover layer 2 is attached to stripping roller 5 so that the cover layer is removed during the unreeling from delivery roll 18 before the tape material has reached cutting device 6. If the composite material is placed in the cassette in cutting station 4, the material must be properly attached to the delivery and storage rolls and cover layer 2 must be attached to stripping roller 5 in a manner to assure the proper positioning of the processing zones.

During operation, the composite material is unreeled from delivery roll 18 until it is empty, cover layer 2 is removed by stripping roller 5, tape material 1 is cut into desired strips 1a by cutting device 6, waste between the strips is removed by means 7, and the uncut support layer 3 carrying strips 1a is wound on storage roll 19. The material is now prepared for laying tape material strips 1a and cassette 17 is removed from cutting station 4 which is immediately ready for insertion of a new cassette.

Figure 4:
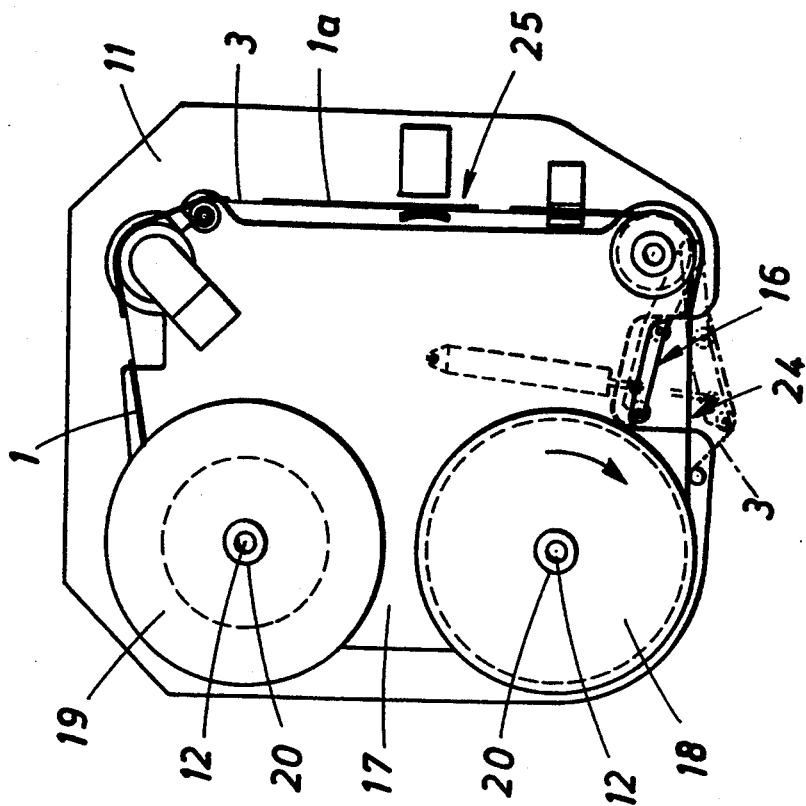
FIGS. 4 and 5 show a portion of the laying head, respectively without and with the cassette.
Figure 5:
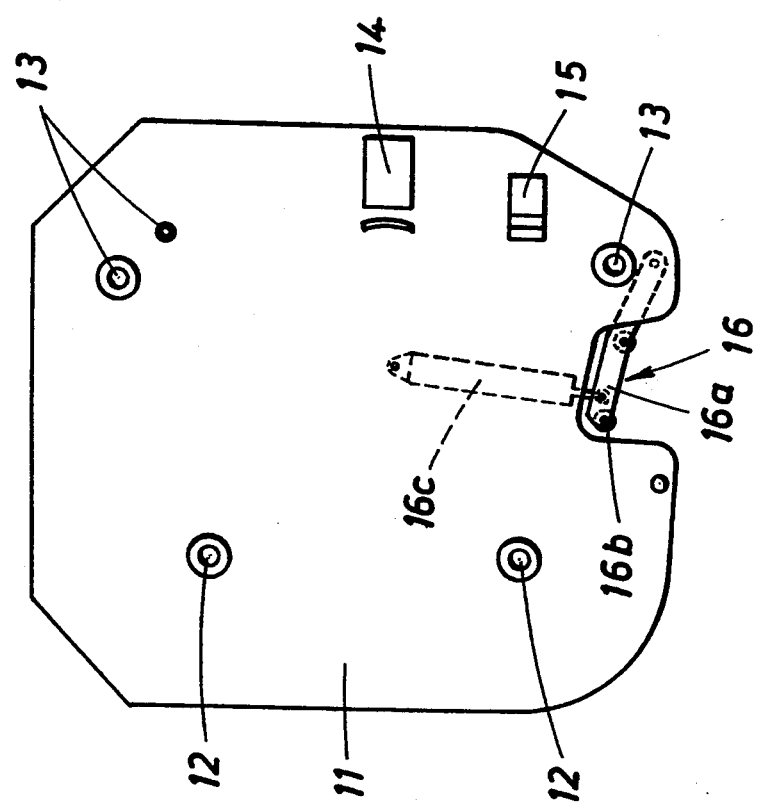

The thus prepared cassette is now inserted in laying head 11 for laying the prepared tape material on laying-up surface 29. Holders 20 for the delivery and storage rolls fit rotatable roll holders 12 to form a plug connection therewith. The laying head comprises means 16 for pressing tape material strips 1a against laying-up surface 29. In the laying head, processing zone 24 of cassette 17 is located in the range of pressing means 16 while processing zone 25 is located in the range of control and guide devices 14, 15 indicated schematically in FIG. 4 showing laying head 11. Pressing means 16 is comprised of pivotal arm 16a operated by pressure fluid-operated adjusting cylinder 16c and carrying pressure roller 16b. When cassette 17 is inserted in laying head 11, pressing means 16 is in the retracted position shown in full lines. As shown in phantom lines, the adjusting cylinder pivots arm 16a into its operating position during the laying operation. During the movement of the laying head relative to the laying-up surface, the prepared material is unreeled from storage roll 19 and wound on empty delivery roll 18 while pressure roller 16b presses tape material strips 1a against laying-up surface 29 to lay the strips on the surface. The strips adhere to the surface and, as the material moves from the storage roll to the empty delivery roll, tape material strips 1a are thus lifted off support layer 3 which is wound on empty delivery roll 18.

Figure 6:
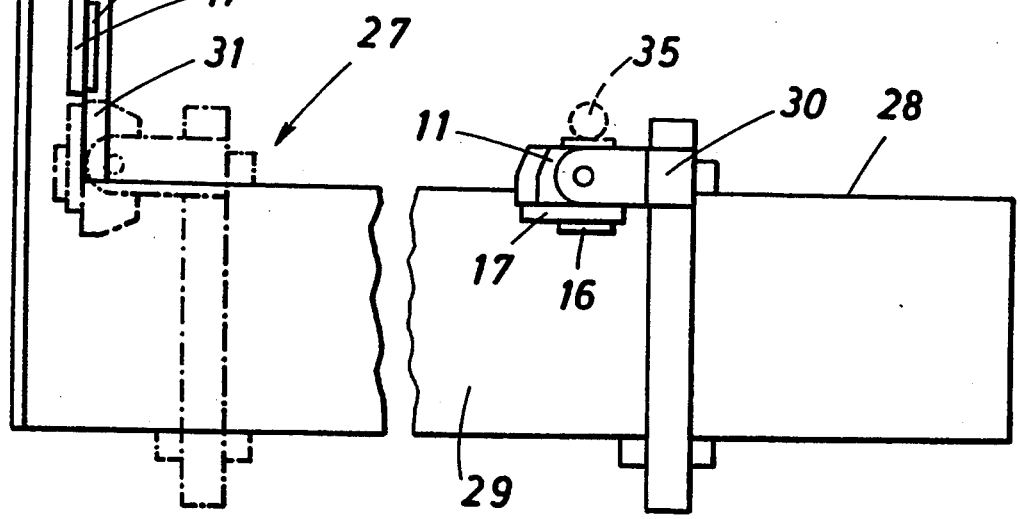
FIG. 6 diagrammatically illustrates the apparatus including a cutting station, a transfer station and the laying head.

As shown in FIG. 6, apparatus 27 for laying tape material strips 1a comprises work table 28 with laying-up surface 29 which may be a workpiece on which the strips are to be laid. Laying head 11 is mounted on carriage 30 which is movable relative to the laying-up surface. The apparatus further comprises cutting station 4 and transfer station 31 located in the path of movement of laying carriage 30 (as indicated in phantom lines). The illustrated transfer station comprises at least two cassette holders 32. Reciprocable cassette manipulator 33 is arranged for moving cassettes 17 between the stations 4 and 31 and between transfer station 31 and laying head 11. The manipulator comprises a gripper 34 for cassettes 17 and is movable for selective insertion of the cassettes in cutting station 4, transfer station 31 and laying head 11.

In operation, a new cassette 17 may be prepared in cutting station 4 while a prepared cassette may simultaneously be placed in laying head 11. After the new cassette has been prepared in the cutting station, gripper 34 of manipulator 33 grips the prepared cassette and moves it from the cutting station into a holder 32 in transfer station 31. After tape material strips 1a have been laid by laying head 11, carriage 30 moves the laying head into the transfer position (shown in phantom lines in FIG. 6) and manipulator 33 grips the empty cassette, places it in the other holder 32 in transfer station 31 and moves the prepared cassette from the one holder 32 to laying head 11. Thus, the laying head is loaded again and ready for the laying operation. Meanwhile, manipulator 32 takes the empty cassette from transfer station 31 to cutting station 4 for preparation of a new cassette. If desired, more than two cassette holders 32 may be provided in transfer station 31 so that a larger number of prepared cassettes may be available for laying of the tape material strips.

The method of laying strips 1a of a tape material carried on support layer 3 on laying-up surface 29 comprises the steps of preparing the tape material in cutting station 4 by unreeling tape material 1 carried on support layer 3 from delivery roll 18 until the delivery roll is empty, cutting the tape material into predetermined strips 1a without cutting through the support layer, removing waste material remaining between the strips and winding the support layer and the strips carried thereon on storage roll 19. Subsequently, the prepared tape material is laid with laying head 11 movable at a predetermined velocity relative to the laying-up surface by unreeling support layer 3 and tape material strips 1a carried thereon from storage roll 19 at a velocity dependent on the moving velocity of the laying head, pressing tape material strips 1a against laying-up surface 29 while lifting the strips from the support layer, and winding support layer 3 on empty delivery roll 18. According to the invention, the delivery roll 18 with tape material 1 carried on support layer 3 and storage roll 19 are placed on exchangeable cassette 17 which is selectively insertable in cutting station 4 and on laying head 11. The cassette is inserted in the cutting station and the tape material is cut during the unreeling from the delivery roll and the winding on the storage roll. This prepared cassette is then inserted in laying head 11 and tape material strips 1a are pressed on laying-up surface 29 during the unreeling from storage roll 19 and the winding on empty delivery roll 18 from which tape material 1 carried by support layer 3 has previously been unreeled.

If a cover layer 2 is arranged on tape material 1 carried on support layer 3, the cover layer is removed before the tape material is cut into strips 1a in cutting station 4.

A cutting unit 35 may be vertically adjustably mounted on a side of laying head 11 facing away from cassette 17, i.e. an underside of the laying head, which enables the workpiece produced on work table 28 by laying of tape material strips 1a to be processed further immediately after the laying operation by cutting it to size. This requires only that the cutting unit be lowered into a cutting position, at which stage laying head 11 is converted into a pallet for support of the workpiece during cutting and carriage 30 may be moved for proper cutting guidance.

What is claimed is:

1. A method of laying strips of a tape material carried on a support layer on a laying-up surface, which comprises the steps of preparing the tape material in a cutting station by unreeling the tape material carried on the support layer from a delivery roll until the delivery roll is empty, cutting the tape material into predetermined strips without cutting through the support layer, removing waste material remaining between the strips and winding the support layer and the strips carried thereon on a storage roll, and subsequently laying the prepared tape material with a laying head movable at a predetermined velocity relative to the laying-up surface by unreeling the support layer and the tape material strips carried thereon from the storage roll at a velocity dependent on the moving velocity of the laying head, pressing the tape material strips against the laying-up surface while lifting the strips from the support layer, and winding the support layer on an empty roll, wherein the improvement comprises the steps of
   (a) placing the delivery roll with the tape material carried on the support layer and the storage roll on an exchangeable cassette selectively insertable in the cutting station and on the laying head,
   (b) inserting the cassette in the cutting station and cutting the tape material during the unreeling from the delivery roll and the winding on the storage roll, and
   (c) then inserting said cassette in the laying head and laying the tape material strips on the laying-up surface during the unreeling from the storage roll and the winding on the empty delivery roll from which the tape material carried by the support layer has previously been unreeled.

2. The method of claim 1, wherein a cover layer is arranged on the tape material carried on the support layer, comprising the further step of removing the cover layer before the tape material is cut into strips in the cutting station.

3. An apparatus for laying strips of a tape material carried on a support layer on a laying-up surface, which comprises a cutting station for preparing the tape material, the cutting station comprising a delivery roll from which the tape material carried on the support layer may be unreeled until the delivery roll is empty, a device for cutting the tape material into predetermined strips without cutting through the support layer, means for removing waste material remaining between the strips and a storage roll on which the support layer and the strips carried thereon may be wound, and a laying head for laying the prepared tape material, the laying head being movable at a predetermined velocity relative to the laying-up surface while the support layer and the tape material strips carried thereon are unreeled from the storage roll at a velocity dependent on the moving velocity of the laying head, and the laying head comprising means pressing the tape material strips against the laying-up surface while lifting the strips from the support layer, and an empty roll for winding the support layer, the cutting station and the laying head further comprising rotatable roll holders for replaceably receiving respective ones of the rolls and means for guiding the tape material carried on the support layer between the rolls, wherein the improvement comprises an exchangeable cassette selectively insertable in the cutting station and the laying head, the cassette comprising
   (a) two holders for the delivery roll and the storage roll,
      (1) the rotatable roll holders in the cutting station and the laying head and the holders for the delivery and storage rolls being arranged to form a plug connection,
   (b) the guiding means defining therebetween processing zones freely accessible from outside the cassette for working on the tape material,
      (1) the processing zones being arranged in the range of the cutting device and the waste material removing means when the cassette is inserted in the cutting station, and in the range of the means pressing the tape material strips against the laying-up surface when the cassette is inserted on the laying head;
   (c) a cover layer arranged on the tape material carried on the support layer, and
   (d) means for removing the cover layer before the tape material is cut into strips in the cutting station.

4. An apparatus for laying strips of a tape material carried on a support layer on a laying-up surface, which comprises a cutting station for preparing the tape material, the cutting station comprising a delivery roll from which the tape material carried on the support layer may be unreeled until the delivery roll is empty, a device for cutting the tape material into predetermined strips without cutting through the support layer, means for removing waste material remaining between the strips and a storage roll on which the support layer and the strips carried thereon may be wound, and a laying head for laying the prepared tape material, the laying head being movable at a predetermined velocity relative to the laying-up surface while the support layer and the tape material strips carried thereon are unreeled from the storage roll at a velocity dependent on the moving velocity of the laying head, and the laying head comprising means pressing the tape material strips against the laying-up surface while lifting the strips from the support layer, and an empty roll for winding the support layer, the cutting station and the laying head further comprising rotatable roll holders for replaceably receiving respective ones of the rolls and means for guiding the tape material carried on the support layer between the rolls, wherein the improvement comprises an exchangeable cassette selectively insertable in the cutting station and the laying head, the cassette comprising
   (a) two holders for the delivery roll and the storage roll,
      (1) the rotatable roll holders in the cutting station and the laying head and the holders for the delivery and storage rolls being arranged to form a plug connection,
(b) the guiding means defining therebetween processing zones freely accessible from outside the cassette for working on the tape material,
  (1) the processing zones being arranged in the range of the cutting device and the waste material removing means when the cassette is inserted in the cutting station, and in the range of the means pressing the tape material strips against the laying-up surface when the cassette is inserted on the laying head;
(c) a transfer station between the cutting station and the laying head; and
(d) a reciprocable cassette manipulator for moving the cassette between the stations and between the transfer station and the laying head.

5. An apparatus for laying strips of a tape material carried on a support layer on a laying-up surface, which comprises a cutting station for preparing the tape material, the cutting station comprising a delivery roll from which the tape material carried on the support layer may be unreeled until the delivery roll is empty, a device for cutting the tape material into predetermined strips without cutting through the support layer, means for removing waste material remaining between the strips and a storage roll on which the support layer and the strips carried thereon may be wound, and a laying head for laying the prepared tape material, the laying head being movable at a predetermined velocity relative to the laying-up surface while the support layer and the tape material strips carried thereon are unreeled from the storage roll at a velocity dependent on the moving velocity of the laying head, and the laying head comprising means pressing the tape material strips against the laying-up surface while lifting the strips from the support layer, and an empty roll for winding the support layer, the cutting station and the laying head further comprising rotatable roll holders for replaceably receiving respective ones of the rolls and means for guiding the tape material carried on the support layer between the rolls, wherein the improvement comprises an exchangeable cassette selectively insertable in the cutting station and the laying head, the cassette comprising
(a) two holders for the delivery roll and the storage roll,
  (1) the rotatable roll holders in the cutting station and the laying head and the holders for the delivery and storage rolls being arranged to form a plug connection,
(b) the guiding means defining therebetween processing zones freely accessible from outside the cassette for working on the tape material,
  (1) the processing zones being arranged in the range of the cutting device and the waste material removing means when the cassette is inserted in the cutting station, and in the range of the means pressing the tape material strips against the laying-up surface when the cassette is inserted on the laying head; and
(c) the laying head comprising a cutting means vertically adjustably mounted on a side of the laying head facing away from the rotatable roll holders.

* * * * *